May 22, 1945.   W. K. SONNEMANN   2,376,830
MAGNETIZING-INRUSH TRIPPING-SUPPRESSOR
Filed May 20, 1943

WITNESSES:

INVENTOR
William K. Sonnemann
BY O. B. Buchanan
ATTORNEY

Patented May 22, 1945

2,376,830

UNITED STATES PATENT OFFICE 2,376,830

MAGNETIZING-INRUSH TRIPPING-SUPPRESSOR

William K. Sonnemann, Roselle Park, N. J., assignor to Westinghouse Electric & Manufacturing Company, East Pittsburgh, Pa., a corporation of Pennsylvania Application May 20, 1943, Serial No. 487,762

20 Claims. (Cl. 175—294)

My invention relates to protective relaying equipment for a polyphase electrical apparatus of a type which is subject to transient fault-simulating conditions when the apparatus is really unfaulted, as in differentially protected transformer-banks in which an erroneous operation of the differential relay is likely to be obtained upon the occurrence of the magnetizing inrush which occurs transiently when voltage is suddenly applied to the transformer-bank.

The principal object of my invention is to provide a novel relay-system, which is operative to suppress the differential fault-responsive relay, or render it ineffective, whenever there is a magnetizing-inrush transient in an unfaulted transformer-bank, but which does not suppress the differential-relay operation if a fault is present at the time of the magnetizing-current inrush.

A more specific object of my invention is to provide a novel form of magnetizing-inrush tripping-suppressor in which there is effected both a reduction in the number of required auxiliary relay-elements, and a simplification of the contact-circuit, as compared to previously known magnetizing-inrush tripping-suppressors.

A still more specific object of my invention is to provide a simple and reliable phase-sequence (or other polyphase) voltage-responsive suppressor-arrangement for accomplishing the stated purposes.

Figure 1:
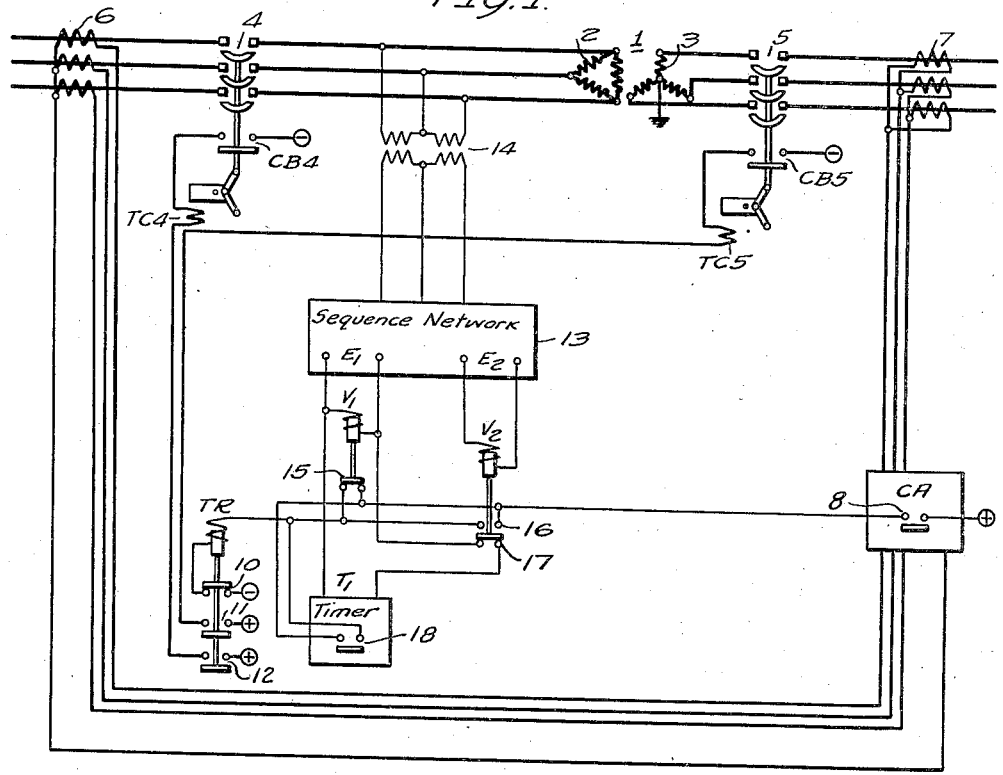
Figure 2:
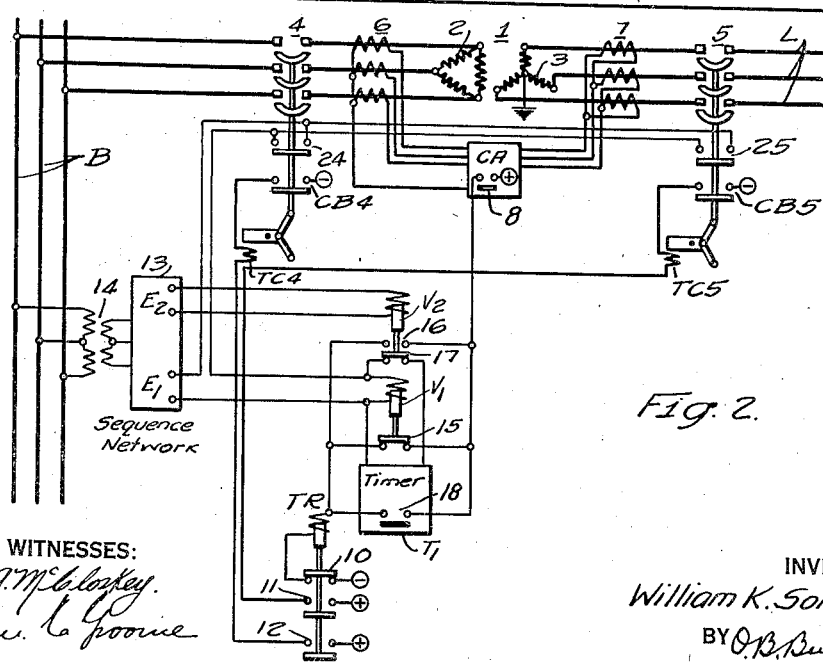

An exemplary form of embodiment of my invention is shown in the accompanying drawing, Figs. 1 and 2 of which are diagrammatic views of circuits and apparatus showing two different forms of embodiment of my invention, applied to the suppression of faulty tripping-operations due to the magnetizing-current inrush, in a differentially protected transformer-bank, although it is to be understood that certain features of my invention are also useful in other relay-applications, in connection with any other polyphase electrical apparatus, for example, an induction motor which is subject to transient current-inrush conditions which look, to the normal protective relay, as if there is a faulty condition, when in fact there is no fault.

In Fig. 1 of the drawing, the transformer-bank to be protected is indicated at 1, as consisting of a three phase bank of power-transformers having delta-connected primary-windings 2, and star-connected secondary windings 3, or vice versa. Three-pole circuit-breakers 4 and 5 are utilized to isolate both the primary and secondary circuits of the transformer-bank 1, each breaker being provided with a trip-coil TC4 and TC5, respectively, and an auxiliary breaker-switch CB4 and CB5, respectively, for interrupting the tripping circuit when the breaker is open.

Any usual or preferred form of fault-responsive relay may be utilized for protecting the polyphase transformer-bank 1 against internal faults. I have shown, by way of illustration, a differential relay CA, for this purpose, which is differentially energized from two banks of current-transformers 6 and 7 in the primary and secondary circuits of the protected transformer-bank 1. The differential relay CA is provided with a make-contact 8 which closes whenever the differential relay CA indicates the existence of a predetermined difference in the ratio of the input and output currents of the protected transformer-bank 1.

The differential-relay contact 8 is utilized to energize a tripping-relay TR, which may have a special break-contact 10 which may be utilized to interrupt its own coil-current at the conclusion of its operation, and a plurality of make-contacts 11 and 12 for energizing the respective trip-coils TC4 and TC5, in order to effect the breaker-opening operations which are necessary in order to isolate the protected transformer-bank 1 in case there should be an internal fault within the transformer-bank.

My invention particularly relates to a so-called suppressor for preventing a faulty tripping-operation as a result of a response of the differential protective relay CA by reason of the magnetizing-current inrush into the transformer-bank 1 whenever voltage is suddenly applied thereto, when there is no fault-condition. Two different illustrative forms of embodiment of my suppressor have been shown in the drawing, but I wish it to be understood that this suppressor may take slightly different forms, and that I am not altogether limited to any one particular form or forms of embodiment.

As illustrated in Fig. 1, the tripping-suppressor makes use of a positive-phase-sequence voltage-responsive relay $V_1$, a negative-phase-sequence voltage-responsive relay $V_2$, and a positive-phase-sequence voltage-energized timer $T_1$, all of which are energized from a sequence network 13 which is energized from a polyphase potential-transformer bank 14 which is responsive to a polyphase voltage of the protected transformer-bank 1. The sequence network 13 segregates the positive and negative phase-sequence voltages, which are supplied to output-terminals $E_1$ and $E_2$ of the network.

The positive-sequence voltage $E_1$ of the network is applied to the positive-sequence relay V₁, while the negative-sequence voltage E₂ of the network is applied to the negative-sequence relay V₂. These relays V₁ and V₂ are instantaneous, or quick-acting relays. In particular, the positive-sequence relay V₁ should be quicker, in its response, than the differential relay CA which is to be supervised. The positive-sequence relay V₁ is provided with a single back-contact 15, while the negative-sequence relay V₂ has a make-contact 16, as well as a back-contact 17.

The timer T₁ may be of the synchronous type, or any other type of time-delay electroresponsive-element which is operative after a time-delay when suitably energized, and which quickly resets itself to its inoperative condition when its energization falls below a predetermined resetting value. In the illustrated embodiment of my invention, the timer T₁ is energized from the positive-sequence network-voltage E₁ in series with the back-contact 17 of the negative-sequence relay V₂.

The timer T₁ is provided with a make-contact 18 which closes whenever the positive-sequence voltage-component E₁ exceeds a predetermined value, but only after a time-delay which is chosen so as to be long enough to allow the differential relay CA to reset as a result of the decay of the magnetizing-inrush transient of the protected transformer-bank 1. The timer T₁ is also operated only in the event that the negative-sequence voltage-component E₂ is below a predetermined value, so that the negative-sequence relay V₂ remains unresponsive. The pickup value of the timer T₁ should be less than the pickup value of the positive-sequence voltage-relay V₁ so as to insure that the timer-contact 18 will begin to close, with its time-delay, whenever the back-contact 15 of the positive-sequence voltage-relay V₁ opens, so as to make sure that the tripping circuit shall not be permanently opened.

The contact-circuit of my magnetizing-inrush tripping-suppressor is extremely simple, consisting of the three relay-contacts 15, 16 and 18, all connected in parallel to each other, and the group of them connected in series-circuit relation with respect to the differential-relay contact 8 and the coil of the tripping relay TR. In this way, my suppressor-means makes it possible for the differential fault-responsive relay CA to energize the tripping relay TR, only when at least one of the three parallel-connected suppressor-contacts 15, 16 and 18 is closed. The positive-sequence voltage-responsive contact 15 is closed only when the positive-sequence voltage-component E₁ is or becomes less than a predetermined value. The negative-sequence voltage-responsive contact 16 is closed only when the negative-sequence voltage-component E₂ is or becomes more than a predetermined value. The timer-contact 18 is closed only after a suitable time-delay for allowing time for the subsidence of the magnetizing-current inrush into the power-transformer bank 1 to the value at which the CA relay resets, and only when the positive-sequence voltage component E₁ is or becomes more than a predetermined value, and when, at the same time, the negative-sequence voltage is or becomes less than a predetermined value.

Since my tripping-suppressor apparatus is responsive to polyphase voltage-quantities, rather than single-phase line-voltages, a single apparatus suffices to respond, even in the event of single-phase faults which may affect only one phase of the line-voltage, but which may occur on any one of the three phases.

The operation of my magnetizing-inrush tripping-suppressor, as shown in Fig. 1, may conveniently be analyzed with respect to four possible conditions, as follows:

(1) When a circuit-breaker 4 or 5 is closed on a dead transformer-bank 1 which is unfaulted, the magnetizing inrush may be sufficient to cause the CA differential-relay contact 8 to start to close. However, because positive-sequence voltage E₁ is delivered by the filter or sequence network 13 as soon as the transformer-bank 1 is energized, the back-contact 15 of the positive-sequence relay V₁ opens immediately. This contact 15 must open before the CA contact 8 closes, and this timing is easily obtained by the proper choice of the relay-elements V₁ and CA. Some negative-sequence voltage E₂ may appear during the inrush-period, due to an unbalance of the inrush-current in the separate phases of the main transformer-bank 1. The pickup value of the negative-sequence relay V₂ should be adjusted so that it will not operate on this relatively small value of negative-sequence voltage, and so that it will thus refrain from closing its make-contact 16. The timer-contact 18 does not close until the expiration of a suitable time-delay after the application of polyphase voltage to the main transformer-bank 1. By the time the timer-contact 18 closes, the CA relay-contact 8 will have reset, or opened, due to the decay of the magnetizing inrush. Thus it is seen that the differential-relay contact 8 may close, as a general rule, during the magnetizing inrush, without energizing the tripping relay TR, thus making it possible to utilize a sensitive setting of the differential relay CA.

(2) If a circuit-breaker 4 or 5 is closed on a dead transformer-bank 1 which is faulted, if the fault is a solid three-phase fault, the positive-sequence relay V₁ will not pick up, for lack of sufficient voltage, and tripping will result immediately through its back-contact 15 in series with the CA contact 8. If the fault is one which does not involve all phases of the polyphase voltage, that is, if the fault is phase-to-phase, two phase-to-ground, or single phase-to-ground, the negative-sequence make-contact 16 will immediately close, in response to the negative-sequence voltage-component E₂, and proper tripping will result upon the closure of the differential-relay contact 8.

The successful, or instantaneous, operation of my protective system, if voltage is applied to a transformer-bank 1 having a three-phase fault within the differential protected zone, is dependent upon a non-response of the positive-sequence relay V₁ under these conditions. If there could be a light three-phase fault, as distinguished from a heavy three-phase fault, there could conceivably be an unwanted pickup response of the positive-sequence relay V₁, in which case the tripping relay TR could be energized only after the expiration of the time-setting of the timing relay T₁. It is difficult to conceive, however, of a light three-phase fault, as three-phase faults will usually exist either between the line-conductors or within the transformer-windings somewhere close to the line-conductors. A three-phase fault would be a light fault only if it could occur simultaneously in all three phases of the star-connected transformer-windings 3, at points which are all close to the neutral connection of said star-connected windings, in all three phases thereof.

This least favorable condition of operation of my protective relay system, in which tripping would not be instantaneous in response to a breaker-closure on a transformer-bank having a light three-phase fault therein, thus requires a triple contingency which is so remote as to be almost unthinkable. First, the three-phase fault must be near the neutral terminal of the three-star-connected windings 3, in order for the fault to be of minor character. Secondly, the fault must be reasonably well balanced, within limits determined by the setting of the negative-sequence voltage relay $V_2$, because a response of the $V_2$ relay would cause an instantaneous tripping-operation, which is desired. Third, the fault must exist in a dead transformer-bank prior to the closing of one of the circuit breakers 4 or 5, or else it must occur after the closing of the breaker but before the timer $T_1$ closes its contact 18. Unless this triple contingency is fulfilled, the operation of my protective system will not involve a time-delay in tripping, in response to a three-phase fault.

(3) If a fault occurs within the transformer-bank 1 during its normal operation, if the fault is a minor one, not drawing much current, the positive-sequence voltage $E_1$ will not be reduced below the dropout value of the timer $T_1$, and tripping will result immediately, through the timer-contact 18, upon the response of the differential protective relay CA. If the fault is a three-phase fault, the positive-sequence voltage $E_1$ will be very substantially reduced, causing the positive-sequence relay $V_1$ to immediately drop out, so that tripping will occur through the positive-sequence back-contact 15, even though the timer-contact 18 opens. If the fault is not a balanced three-phase fault and of such magnitude as to cause a dropping out of the positive-sequence timer $T_1$, then the fault will be of such magnitude that the negative-sequence voltage-component $E_2$ will be sufficient to pick up the negative-sequence relay $V_2$, causing tripping through the make-contact 16 as soon as the differential relay CA responds.

(4) In the event of an external fault, that is, a fault somewhere on the electrical system, but not within the differentially protected zone between the two current-transformers 6 and 7, the differential relay CA will not at first operate, because the input and output currents of the protected transformer-bank 1 will be equal or will have the proper current-ratio and direction. If the external fault is a severe one, resulting in a considerable reduction in the voltage of the protected transformer-bank 1, then when the external fault is cleared and full voltage is suddenly restored to the protected transformer-bank 1, there may be a sufficient magnetizing inrush or recovery surge in the protected transformer-bank to actuate the CA differential-relay. Thus, if the external fault is sufficiently severe to occasion a substantial recovery-surge which is likely to operate the differential-relay contact 8, then the voltage will have been reduced sufficiently to cause a drop-out of the timer $T_1$. If the external fault was an unbalanced fault which did not reduce the positive-sequence voltage-component $E_1$ below the drop-out setting of the timer $T_1$, the timer will nevertheless drop out, or reset, through the response of the negative-sequence relay $V_2$, which opens its back-contact 17 and deenergizes the timer $T_1$. Thus, when the external fault is cleared, and a recovery-surge is experienced, the timer-contact 18 will be momentarily open, and the operation of the combination will be similar to the operation already described under the condition (1) in which voltage was applied to an unfaulted transformer-bank.

In Fig. 2, I have shown another form of embodiment of my invention, in which the potential-transformer 14 is energized from the polyphase station-bus B, which is in accord with the usual station-practice. In this form of my invention, the protected transformer 1 is connected between the polyphase bus B and the polyphase line or circuit L by means of the circuit-breaks 4 and 5, respectively, and these circuit-breakers are provided with additional auxiliary switches 24 and 25 which close when the respective breakers close, or preferably very slightly after the main contacts of the respective breakers first come into contact in the closing operation. As shown in Fig. 2 these auxiliary switches are connected in parallel with each other and in series with the energizing circuit of the timer $T_1$ or in series with the energizing circuits of both the timer $T_1$ and the positive-sequence relay $V_1$. Thus, if both breakers 4 and 5 are opened, the voltage-relay $V_1$ and the timer $T_1$ will be deenergized as effectively as in Fig. 1, but when either breaker 4 or 5 closes, voltage will be simultaneously applied to the protected transformer 1, the voltage-relay $V_1$, and the timer $T_1$, as effectively as in Fig. 1.

While I have shown my invention in two preferred forms of embodiment, for illustrative purposes, and while I have described its theory of operation and design, to the best of my present understanding, I wish it to be understood that my invention, in its broader aspects, is not limited to any particular form or forms of embodiment, or to any particular theory of operation or design, and I desire that the appended claims shall be accorded the broadest interpretation consistent with their language.

I claim as my invention:

1. Protective relaying equipment for a polyphase electrical apparatus of a type subject to transient fault-simulating conditions when unfaulted, comprising the combination, with said apparatus and its fault-responsive relay, of suppressor-means for at times rendering said fault-responsive relay ineffective, said suppressor-means comprising positive-phase-sequence voltage-responsive means having a quickly acting part operative to render said fault-responsive relay effective only when the positive-phase-sequence component of a polyphase voltage of the protected apparatus is or becomes less than a predetermined value, said positive-phase-sequence voltage-responsive means having a time-delay part operative to render said fault-responsive relay effective only after a time-delay after the positive-phase-sequence component of a polyphase voltage of the protected apparatus has become more than a predetermined value, and a quickly acting negative-phase-sequence voltage-responsive means operative to quickly render said fault-responsive relay effective only when the negative-phase-sequence component of a polyphase voltage of the protected apparatus is or becomes more than a predetermined value.

2. Protective relaying equipment for a polyphase electrical apparatus of a type subject to transient fault-simulating conditions when unfaulted, comprising the combination, with said apparatus and its fault-responsive relay, of suppressor-means for at times rendering said fault-responsive relay ineffective, said suppressor-means comprising positive-phase-sequence voltage-responsive means having a quickly acting part operative to render said fault-responsive relay effective only when the positive-phase-sequence component of a polyphase voltage of the protected apparatus is or becomes less than a predetermined value, said positive-phase-sequence voltage-responsive means having a time-delay part operative to render said fault-responsive relay effective only after a time-delay after the positive-phase-sequence component of a polyphase voltage of the protected apparatus has become more than a predetermined value, said time-delay part quickly resetting itself to its inoperative condition when its applied voltage falls below a predetermined value, and a quickly acting negative-phase-sequence voltage-responsive means operative to quickly render said fault-responsive relay effective only when the negative-phase-sequence component of a polyphase voltage of the protected apparatus is or becomes more than a predetermined value.

3. Protective relaying equipment for a polyphase electrical apparatus of a type subject to transient fault-simulating conditions when unfaulted, comprising the combination, with said apparatus and its fault-responsive relay, of suppressor-means for at times rendering said fault-responsive relay ineffective, said suppressor-means comprising positive-phase-sequence voltage-responsive means having a quickly acting part operative to render said fault-responsive relay effective only when the positive-phase-sequence component of a polyphase voltage of the protected apparatus is or becomes less than a predetermined value, said positive-phase-sequence voltage-responsive means having a time-delay part operative to render said fault-responsive relay effective only after a time-delay after the positive-phase-sequence component of a polyphase voltage of the protected apparatus has become more than a predetermined value, said time-delay part quickly resetting itself to its inoperative condition when its applied voltage falls below a predetermined value, and a quickly acting negative-phase-sequence voltage-responsive means operative to quickly render said fault-responsive relay effective and to quickly deenergize said time-delay part, only when the negative-phase-sequence component of a polyphase voltage of the protected apparatus is or becomes more than a predetermined value.

4. Protective relaying equipment for a polyphase electrical apparatus of a type subject to transient fault-simulating conditions when unfaulted, comprising the combination, with said apparatus and its fault-responsive relay, of suppressor-means for at times rendering said fault-responsive relay ineffective, said suppressor-means comprising a quickly acting positive-phase-sequence voltage-responsive means operative to render said fault-responsive relay effective only when the positive-phase-sequence component of a polyphase voltage of the protected apparatus is or becomes less than a predetermined value, a time-delay voltage-responsive means operative to render said fault-responsive relay effective only after a time-delay after the fulfillment of the double condition wherein the positive-phase-sequence component of a polyphase voltage of the protected apparatus has become more than a predetermined value and the negative-phase-sequence component of a polyphase voltage of the protected apparatus has become less than a predetermined value, and a quickly acting negative-phase-sequence voltage-responsive means operative to quickly render said fault-responsive relay effective only when the negative-phase-sequence component of a polyphase voltage of the protected apparatus is or becomes more than a predetermined value.

5. Protective relaying equipment for a polyphase electrical apparatus of a type subject to transient fault-simulating conditions when unfaulted, comprising the combination, with said apparatus and its fault-responsive relay, of suppressor-means for at times rendering said fault-responsive relay ineffective, said suppressor-means comprising a quickly acting positive-phase-sequence voltage-responsive means operative to render said fault-responsive relay effective only when the positive-phase-sequence component of a polyphase voltage of the protected apparatus is or becomes less than a predetermined value, a time-delay voltage-responsive means operative to render said fault-responsive relay effective only after a time-delay after the fulfillment of the double condition wherein the positive-phase-sequence component of a polyphase voltage of the protected apparatus has become more than a predetermined value and the negative-phase-sequence component of a polyphase voltage of the protected apparatus has become less than a predetermined value, said time-delay voltage-responsive means quickly resetting itself to its inoperative condition either if the positive-phase-sequence component has become less than a predetermined value or if the negative-phase-sequence component has become more than a predetermined value, and a quickly acting negative-phase-sequence voltage-responsive means operative to quickly render said fault-responsive relay effective only when the negative-phase-sequence component of a polyphase voltage of the protected apparatus is or becomes more than a predetermined value.

6. Protective relaying equipment for a polyphase electrical apparatus of a type subject to transient fault-simulating conditions when unfaulted, comprising the combination, with said apparatus and its fault-responsive relay, of suppressor-means for at times rendering said fault-responsive relay ineffective, said suppressor-means comprising a quickly operating voltage-responsive means operative to render said fault-responsive relay effective only when a polyphase voltage of the protected apparatus is or becomes less than a predetermined value, a time-delay electroresponsive element operative after a time-delay when suitably energized, and quickly resettable to inoperative condition when its energization falls below a predetermined resetting value, means for causing said time-delay element to be suitably energized in response to a polyphase voltage of the protected apparatus in the absence of a predetermined fault-condition involving less than all of the phases of the protected apparatus, and means for causing the energization of said time-delay element to fall below said predetermined resetting value in response to the occurrence of either a predetermined drop in the polyphase voltage of the protected apparatus or a predetermined fault-condition involving less than all of the phases of the protected apparatus, said time-delay element, in its operative condition, rendering said fault-responsive relay effective.

7. Protective relaying equipment for a polyphase electrical apparatus of a type subject to transient fault-simulating conditions when unfaulted, comprising the combination, with said apparatus and its fault-responsive relay, of suppressor-means for at times rendering said fault-responsive relay ineffective, said suppressor-means comprising a quickly operating voltage-responsive means operative to render said fault-responsive relay effective only when a polyphase voltage of the protected apparatus is or becomes less than a predetermined value, a time-delay electroresponsive element operative after a time-delay when suitably energized, and quickly resettable to inoperative condition when its energization falls below a predetermined resetting value, means for causing said time-delay element to be suitably energized in response to a polyphase voltage of the protected apparatus in the absence of a predetermined fault-condition involving less than all of the phases of the protected apparatus, means for causing the energization of said time-delay element to fall below said predetermined resetting value in response to the occurrence of either a predetermined drop in the polyphase voltage of the protected apparatus or a predetermined fault-condition involving less than all of the phases of the protected apparatus, said time-delay element, in its operative condition, rendering said fault-responsive relay effective, and a quickly acting relay-element operative in response to a predetermined fault-condition involving less than all of the phases of the protected apparatus for quickly rendering said fault-responsive relay effective.

8. A magnetizing-inrush tripping-suppressor for a differential fault-responsive relay for the protection of a polyphase transformer-bank against internal faults, said suppressor comprising positive-phase-sequence voltage-responsive means having a quickly acting part operative to render said fault-responsive relay effective only when the positive-phase-sequence component of a polyphase voltage of the transformer-bank is or becomes less than a predetermined value, said positive - phase - sequence voltage - responsive means having a time-delay part operative to render said fault-responsive relay effective only after a time-delay after the positive-phase-sequence component of a polyphase voltage of the transformer-bank has become more than a predetermined value, and a quickly acting negative-phase-sequence voltage-responsive means operative to quickly render said fault-responsive relay effective only when the negative-phase-sequence component of a polyphase voltage of the transformer-bank is or becomes more than a predetermined value.

9. A magnetizing-inrush tripping-suppressor for a differential fault-responsive relay for the protection of a polyphase transformer-bank against internal faults, said suppressor comprising positive-phase-sequence voltage-responsive means having a quickly acting part operative to render said fault-responsive relay effective only when the positive-phase-sequence component of a polyphase voltage of the transformer-bank is or becomes less than a predetermined value, said positive - phase - sequence voltage - responsive means having a time-delay part operative to render said fault-responsive relay effective only after a time-delay after the positive-phase-sequence component of a polyphase voltage of the transformer-bank has become more than a predetermined value, said time-delay part quickly resetting itself to its inoperative condition when its applied voltage falls below a predetermined value, and a quickly acting negative-phase-sequence voltage-responsive means operative to quickly render said fault-responsive relay effective only when the negative-phase-sequence component of a polyphase voltage of the transformer-bank is or becomes more than a predetermined value.

10. A magnetizing-inrush tripping-suppressor for a differential fault-responsive relay for the protection of a polyphase transformer-bank against internal faults, said suppressor comprising positive-phase-sequence voltage-responsive means having a quickly acting part operative to render said fault-responsive relay effective only when the positive-phase-sequence component of a polyphase voltage of the transformer-bank is or become less than a predetermined value, said positive - phase - sequence voltage - responsive means having a time-delay part operative to render said fault-responsive relay effective only after a time-delay after the positive-phase-sequence component of a polyphase voltage of the transformer-bank has become more than a predetermined value, said time-delay part quickly resetting itself to its inoperative condition when its applied voltage falls below a predetermined value, and a quickly acting negative-phase-sequence voltage-responsive means operative to quickly render said fault-responsive relay effective and to quickly deenergize said time-delay part, only when the negative-phase-sequence component of a polyphase voltage of the transformer-bank is or becomes more than a predetermined value.

11. A magnetizing-inrush tripping-suppressor for a differential fault-responsive relay for the protection of a polyphase transformer-bank against internal faults, said suppressor comprising a quickly acting positive-phase-sequence voltage-responsive means operative to render said fault-responsive relay effective only when the positive-phase-sequence component of a polyphase voltage of the transformer-bank is or becomes less than a predetermined value, a time-delay voltage-responsive means operative to render said fault-responsive relay effective only after a time-delay after the fulfillment of the double condition wherein the positive-phase-sequence component of a polyphase voltage of the transformer-bank has become more than a predetermined value and the negative-phase-sequence component of a polyphase voltage of the transformer-bank has become less than a predetermined value, and a quickly acting negative-phase-sequence voltage-responsive means operative to quickly render said fault-responsive relay effective only when the negative-phase-sequence component of a polyphase voltage of the transformer-bank is or becomes more than a predetermined value.

12. A magnetizing-inrush tripping-suppressor for a differential fault-responsive relay for the protection of a polyphase transformer-bank against internal faults, said suppressor comprising a quickly acting positive-phase-sequence voltage-responsive means operative to render said fault-responsive relay effective only when the positive-phase-sequence component of a polyphase voltage of the transformer-bank is or becomes less than a predetermined value, a time-delay voltage-responsive means operative to render said fault-responsive relay effective only after a time-delay after the fulfillment of the double condition wherein the positive-phase-sequence component of a polyphase voltage of the transformer-bank has become more than a predetermined value and the negative-phase-sequence component of a polyphase voltage of the transformer-bank has become less than a predetermined value, said time-delay voltage-responsive means quickly resetting itself to its inoperative condition either if the positive-phase-sequence component has become less than a predetermined value or if the negative-phase-sequence component has become more than a predetermined value, and a quickly acting negative-phase-sequence voltage-responsive means operative to quickly render said fault-responsive relay effective only when the negative-phase-sequence component of a polyphase voltage of the transformer-bank is or becomes more than a predetermined value.

13. A magnetizing-inrush tripping-suppressor for a differential fault-responsive relay for the protection of a polyphase transformer-bank against internal faults, said suppressor comprising a quickly operating voltage-responsive means operative to render said fault-responsive relay effective only when a polyphase voltage of the transformer bank is or becomes less than a predetermined value, a time-delay electroresponsive element operative after a time-delay when suitably energized, and quickly resettable to inoperative condition when its energization falls below a predetermined resetting value, means for causing said time-delay element to be suitably energized in response to a polyphase voltage of the transformer-bank in the absence of a predetermined fault-condition involving less than all of the phases of the transformer bank, and means for causing the energization of said time-delay element to fall below said predetermined resetting value in response to the occurrence of either a predetermined drop in the polyphase voltage of the transformer-bank or a predetermined fault-condition involving less than all of the phases of the transformer-bank, said time-delay element, in its operative condition, rendering said fault-responsive relay effective.

14. A magnetizing-inrush tripping-suppressor for a differential fault-responsive relay for the protection of a polyphase transformer-bank against internal faults, said suppressor comprising a quickly operating voltage-responsive means operative to render said fault-responsive relay effective only when a polyphase voltage of the transformer bank is or becomes less than a predetermined value, a time-delay electroresponsive element operative after a time-delay when suitably energized, and quickly resettable to inoperative condition when its energization falls below a predetermined resetting value, means for causing said time-delay element to be suitably energized in response to a polyphase voltage of the transformer-bank in the absence of a predetermined fault-condition involving less than all of the phases of the transformer bank, means for causing the energization of said time-delay element to fall below said predetermined resetting value in response to the occurrence of either a predetermined drop in the polyphase voltage of the transformer-bank or a predetermined fault-condition involving less than all of the phases of the transformer-bank, said time-delay element, in its operative condition, rendering said fault-responsive relay effective, and a quickly acting relay-element operative in response to a predetermined fault-condition involving less than all of the phases of the transformer-bank for quickly rendering said fault-responsive relay effective.

15. Protective relaying equipment for a polyphase electrical transformer adapted to be connected between a polyphase bus and a polyphase circuit by circuit-interrupters, one on either side of said transformer, each circuit-interrupter having an auxiliary switch which closes when the interrupter closes, said protective relaying equipment comprising the combination, with said protected transformer and said auxiliary switches, of a differential fault-responsive relay for responding to faults within said protected transformer, and suppressor-means for at times rendering said differential fault-responsive relay ineffective, said suppressor-means comprising a bus-energized positive-phase-sequence relaying-circuit, a bus-energized negative-phase-sequence relaying-circuit, a positive-phase-sequence voltage-responsive means which is operative, in its responsive condition, to quickly render said differential fault-responsive relay ineffective, a time-delay means which is operative, in its responsive condition, to render said differential fault-responsive relay effective, a negative-phase-sequence voltage-responsive means which is operative, in its responsive condition, to quickly render said differential fault-responsive relay effective, circuit-means operative to energize said positive and negative phase-sequence voltage-responsive means respectively from said positive and negative phase-sequence relaying-circuits, and means for causing said time-delay means to be effectively energized only when at least one of said auxiliary switches is closed, and when at the same time more than a predetermined voltage appears on said positive-phase-sequence relaying-circuit.

16. Protective relaying equipment for a polyphase electrical transformer adapted to be connected between a polyphase bus and a polyphase circuit by circuit-interrupters, one on either side of said transformer, each circuit-interrupter having an auxiliary switch which closes when the interrupter closes, said protective relaying equipment comprising the combination, with said protected transformer and said auxiliary switches, of a differential fault-responsive relay for responding to faults within said protected transformer, and suppressor-means for at times rendering said differential fault-responsive relay ineffective, said suppressor-means comprising a bus-energized positive-phase-sequence relaying-circuit, a bus-energized negative-phase-sequence relaying-circuit, a positive-phase-sequence voltage-responsive means which is operative, in its responsive condition, to quickly render said differential fault-responsive relay ineffective, a time-delay means which is operative, in its responsive condition, to render said differential fault-responsive relay effective, a negative-phase-sequence voltage-responsive means which is operative, in its responsive condition, to quickly render said differential fault-responsive relay effective, circuit-means operative to energize said positive and negative phase-sequence voltage-responsive means respectively from said positive and negative phase-sequence relaying-circuits, and means for causing said time-delay means to be effectively energized only when at least one of said auxiliary switches is closed, and when at the same time more than a predetermined voltage appears on said positive-phase-sequence relaying-circuit, and when at the same time less than a predetermined voltage appears on said negative-phase-sequence relaying-circuit.

17. The invention as defined in claim 15, characterized by said circuit-means for energizing the positive-phase-sequence voltage-responsive means being effective only when at least one of said auxiliary switches is closed.

18. The invention as defined in claim 16, characterized by said circuit-means for energizing the positive-phase-sequence voltage-responsive means being effective only when at least one of said auxiliary switches is closed.

19. Protective relaying equipment for a polyphase electrical transformer adapted to be connected between a polyphase bus and a polyphase circuit by circuit-interrupters, one on either side of said transformer, each circuit-interrupter having an auxiliary switch which closes when the interrupter closes, said protective relaying equipment comprising the combination, with said protected transformer and said auxiliary switches, of a differential fault-responsive relay for responding to faults within said protected transformer, and suppressor-means for at times rendering said differential fault-responsive relay ineffective, said suppressor-means comprising a bus-energized source of polyphase relaying-voltage, a polyphase-voltage-responsive means which is operative, in its responsive condition, to quickly render said differential fault-responsive relay ineffective, a time-delay means which is operative, in its responsive condition, to render said differential fault-responsive relay effective, circuit-means operative to energize said polyphase-voltage-responsive means from said relaying-voltage source, means for causing said time-delay means to be effectively energized only when more than a predetermined polyphase voltage appears in said relaying-voltage source, and means for preventing effective energization of said time-delay means when both of said auxiliary switches are open.

20. Protective relaying equipment for a polyphase electrical transformer adapted to be connected between a polyphase bus and a polyphase circuit by circuit-interrupters, one on either side of said transformer, each circuit-interrupter having an auxiliary switch which closes when the interrupter closes, said protective relaying equipment comprising the combination, with said protected transformer and said auxiliary switches, of a differential fault-responsive relay for responding to faults within said protected transformer, and suppressor-means for at times rendering said differential fault-responsive relay ineffective, said suppressor-means comprising a bus-energized source of polyphase relaying-voltage, a polyphase-voltage-responsive means which is operative, in its responsive condition, to quickly render said differential fault-responsive relay ineffective, a time-delay means which is operative, in its responsive condition, to render said differential fault-responsive relay effective-circuit-means operative to energize said polyphase-voltage-responsive means from said relaying-voltage source, means for causing said time-delay means to be effectively energized only when more than a predetermined polyphase voltage appears in said relaying-voltage source, means for preventing effective energization of said time-delay means when both of said auxiliary switches are open, fault responsive means for preventing the effective energization of said time-delay means in response to a predetermined unbalanced fault-condition appearing on the protected transformer, and fault-responsive means for quickly rendering said differential fault-responsive relay effective in response to a predetermined unbalanced fault-condition appearing on the protected transformer.

WILLIAM K. SONNEMANN.